United States Patent [19]
Krawczyk

[11] Patent Number: 6,025,007
[45] Date of Patent: *Feb. 15, 2000

[54] CELLULOSE COMPOSITION, ITS PREPARATION AND ITS USE IN FOODS

[75] Inventor: Gregory R. Krawczyk, Princeton Junction, N.J.

[73] Assignee: FMC Corporation, Philadelphia, Pa.

[ * ] Notice: This patent is subject to a terminal disclaimer.

[21] Appl. No.: 08/683,513

[22] Filed: May 28, 1996

[51] Int. Cl.⁷ .................................................. A23L 1/0534
[52] U.S. Cl. ........................ 426/573; 426/601; 426/604; 426/804
[58] Field of Search .................................... 426/573, 601, 426/604, 804

[56] References Cited

U.S. PATENT DOCUMENTS

| | | | |
|---|---|---|---|
| 5,441,753 | 8/1995 | McGinley | 426/96 |
| 5,462,761 | 10/1995 | McGinley | 426/656 |
| 5,534,285 | 7/1996 | Setser | 426/496 |
| 5,736,177 | 4/1998 | McGinley | 426/96 |

*Primary Examiner*—Carolyn Paden
*Attorney, Agent, or Firm*—Polly E. Ramstad; I. Robert Silverman

[57] ABSTRACT

The invention is directed to a cellulose composition useful as a texturizing, thickening, stabilizing, gelling or bulking agent for food systems comprising a combination of (1) a finely divided cellulose component and (2) a surfactant component comprising one or more surfactants, in powder aggregate form; to the use of this agent in lipids and in reduced fat foods; and to the method of making the agent. The invention is also directed to the resulting stabilized lipids, which have viscosity and consistency characteristics that were previously only obtainable with use of stabilizers such as fats that have the undesirable effect of increasing LDL and decreasing HDL.

22 Claims, 3 Drawing Sheets

Viscosity of Colloidal MCC/Sorbitan Monostearate (85/15) with Various Oil Types as a Function of Solids Concentration Figure 3
Viscosity of Colloidal MCC/Sorbitan Monostearate at Varying Ratios as a Function of Shear

CELLULOSE COMPOSITION, ITS PREPARATION AND ITS USE IN FOODS

TECHNICAL FIELD

This invention is directed to texturizing, thickening, stabilizing, gelling and bulking agents and their preparation. More particularly, this invention is directed to texturizing, thickening, stabilizing, gelling and bulking agents for edible food systems wherein the agents comprise finely divided cellulose and selected surfactants.

BACKGROUND ART

Food systems containing lipids, i.e., fats or oils, have been the subject of much research to develop alternative versions that either contain "healthier" lipids or contain reduced lipid levels. Many commercialized versions of such food systems, however, fail to match the sensory characteristics of the original food systems they were intended to duplicate.

Many foodstuffs contain oils which are especially useful to impart flavor and taste characteristics. Most of the desirable, healthy oils, such as canola oil and safflower oil, are liquid at room temperature, whereas most of the undesirable, "unhealthy" oils, such as shortening and lard, have a plastic-like consistency. It is known that the viscosity and consistency of such liquid oils can be increased by addition of finely divided solids, e.g., highly dispersed silica or silica gel in industrial applications or high-melting fat crystals in edible foods. See, for example, U.S. Pat. Nos. 4,605,653, 4,652,458, and 4,375,483, all of which are incorporated herein by reference.

Unsaturated fatty acids present in natural vegetable oils which make up triacylglycerols are of a cis-fatty acid configuration. Due to the non-linearity of the cis-fatty oil compounds, vegetable oils are in liquid form. By means of the hydrogenation process, hydrogen atoms are added to the cis-double bond to produce straight-chain saturated fatty acids. This process, if carried out selectively, can also be used to transform the cis-configuration of the fatty acid to its trans-isomer, which in turn increases the linearity of the fatty acid chains and thus their melting points without altering the degree of saturation or fully saturating the hydrocarbon chain. Through the process of selectivity, hydrogenation can be controlled to minimize saturation and maximize the production of the transconfigurations of fatty acids (partial hydrogenation).

High melting fats, those which are saturated or have been partially hydrogenated, have important functions in a vast majority of food products. These fat crystals are added to liquid oils to impart structure/texture and plasticity by the interaction of many small fat crystals which restrict the flow of oil until some form of stress is applied. At rest the rheological properties of the fat are altered to produce conventional body and consistency found to be characteristic of shortening, margarine, etc. Another benefit of adding solid fats to liquid oils is that it increases the oxidative stability of liquid oil. Plastic fats are also useful in bakery applications to impart flakiness, body, and volume and to give aeration properties. Studies have shown that both fat types, saturated fats as well as those comprised of trans-fatty acids, raise the low density lipoprotein (LDL) cholesterol levels and lower high density lipoprotein (HDL) cholesterol, the "good cholesterol," which in turn increases the risk of coronary heart disease. Therefore, the need arises for alternative ingredients to texturize liquid fats which would have the same consistency and functionality as highly saturated fats or partially hydrogenated oils but which would be more healthful.

Further, U.S. Pat. No. 3,539,365 of Durand et al., incorporated herein by reference, discloses the use of conventional sodium carboxymethyl cellulose (CMC)-containing finely divided cellulose as a gelling agent, where water is required to activate the resulting composition. The CMC acts as a barrier dispersant, i.e., it functions as a barrier to prevent bonding of the colloidal cellulose particles during drying and acts to disperse the compacted cellulose particles during reconstitution, in aqueous systems. Whereas the compositions disclosed in the '365 patent are widely used in water-based food systems, they do not function well in non-aqueous systems since they require water to activate the soluble CMC portion.

Non-lipid-based food systems, i.e., water-based food systems that also contain lipids, have been the subject of significant effort to develop reduced fat or fat free versions that nevertheless possess the desirable sensory characteristics of the full fat food systems. Materials used to replace the caloric content or fat content of food systems are often termed "bulking agents"; powdered and microcrystalline cellulose have been utilized in reduced fat food products; see, e.g., U.S. Pat. No. 3,023,104 of Battista which describes the use of "cellulose crystallite aggregates" in reduced calorie foods and U.S. Pat. No. 3,067,037 of Herald et al. which describes foamable foods containing cellulose crystallite aggregates blended with a foaming agent.

The invention presented herein advantageously provides a new thickener, stabilizer, gelling agent for use in food systems, including in edible lipid food systems and in reduced fat food systems.

DISCLOSURE OF THE INVENTION

One aspect of the present invention is a composition that is a dry, free flowing aggregate having about 50% to about 95% by weight of a finely divided cellulose component and having about 5% to about 50% by weight of a surfactant component coprocessed with the cellulose, all percentages being based on the total weight of the aggregate. The present invention also includes a composition that is a dry, free flowing aggregate having about 60% to about 95% by weight finely divided microcrystalline cellulose and having about 5% to about 40% by weight surfactant coprocessed with the cellulose, all percentages being based on the total weight of the aggregate.

Another aspect of this invention is a method for making cellulose-surfactant aggregates comprising forming a mixture of finely divided microcrystalline cellulose that is substantially colloidal in particle size and surfactant, the microcrystalline cellulose and surfactant being present in a weight ratio of from about 95:5 to about 60:40; subjecting the mixture of microcrystalline cellulose and surfactant to high shear processing; and recovering the processed mixture as free flowing cellulose-surfactant aggregates.

The invention also includes a method for modifying an edible liquid, by texturizing, stabilizing, thickening or gelling the lipid, by admixing the liquid with from about 5% to about 25% of the composition as described above, based upon the total weight of the composition and the lipid, to form an admixture, and shearing the admixture to disperse the composition in the lipid. A stabilized edible lipid composition prepared by this method is another aspect of the invention.

Still another aspect of the invention is a method of making a cellulose-surfactant composition as described above by admixing the cellulose component and surfactant component, mixing until the admixture is uniform, and drying the admixture to recover a free flowing aggregate.

Still another aspect of the invention is a food product comprising a reduced fat food product containing the cellulose-surfactant composition as described above. Exemplary reduced fat food products include a frozen dessert, a whipped topping, a pourable dressing, a viscous dressing, a nondairy creamer, a dairy spread, a nondairy spread, a soup, a sauce, a gravy, a dip, a pudding, an extruded snack, a bakery product, a yogurt, a cheese and an emulsified meat.

The composition of this invention provides structuring, texturizing, thickening, stabilizing, gelling and/or bulking properties to food products containing the composition.

BEST MODE FOR CARRYING OUT THE INVENTION

According to the invention a composition comprising a dry form texturizing, thickening, stabilizing, gelling and bulking agent is useful in food products, including those based on lipid systems. More specifically, the composition is a co-dried, preferably oleaginous, powder composition which is an aggregate of finely divided, substantially colloidal cellulose, preferably microcrystalline cellulose of colloidal particle size, and one or more surfactants. Such surfactant-containing cellulose aggregates (also sometimes referred to in this disclosure as a "cellulose-surfactant composition" or "cellulose composition") are prepared by coprocessing a finely divided cellulose component with a surfactant component, as described in more detail below.

The aggregate, when mixed with a lipid-based food system such as an oil or with an aqueous-based food system, disaggregates, upon the application of shear, to form a dispersion of surfactant and substantially colloidal cellulose; preferably the substantially colloidal cellulose is coated with the surfactant. This dispersion of the coated, substantially colloidal cellulose particles provides desirable properties to food systems when present in relatively small amounts; these properties include texturizing, bulking and stabilizing in reduced fat water-containing food products and include texturizing, thickening, gelling and other useful rheological properties in oil or lipid-based food products. Lipids structured with the cellulose-surfactant composition of the invention have the consistency and functionality of some highly saturated fats or hydrogenated oils, making them useful in the formulation of "healthy" foods by providing some of the functionality of highly saturated fats or partially hydrogenated oils. The resulting colloidal network provided by the presence of the cellulose-surfactant composition imparts heat stable form retention at high temperatures and functions to maintain particles such as salt, flavor, or color in suspension in the lipid.

The texturizing, stabilizing, gelling and bulking compositions of the invention comprise a powder comprising from about 90% to 50% by weight, preferably from about 85% to 60% by weight, of finely divided, substantially colloidal cellulose particles and from about 10% to 50% by weight, preferably from about 15% to 40% by weight, most preferably from 10% to 30% by weight of one or more surfactants, based upon the total weight of the powder.

For cellulose-surfactant compositions intended for use in aqueous-based food systems, particularly reduced fat or nonfat food systems, the cellulose-surfactant aggregate may contain from about 60% to about 95% by weight finely divided microcrystalline cellulose and from about 5% to about 40% by weight surfactant coprocessed with the cellulose, all percentages based on the total weight of cellulose-surfactant aggregate. Preferably, the microcrystalline cellulose component is present in an amount of from about 70% to about 95% by weight. Preferably, the surfactant component is present in an amount of from about 5% to about 30% by weight. More preferably, the surfactant component is present in an amount of at least about 10% by weight and less than about 30% by weight.

The finely divided cellulose is preferably microcrystalline cellulose, preferably comprising substantially colloidal sized particles. The finely divided, substantially colloidal cellulose particles have a mean particle size substantially in the range of from about 0.1 to about 8 microns (micrometer or $\mu$), preferably from 0.1 to less than about 1.0 micron, more preferably from about 0.1 to about 0.9 micron, and most preferably from about 0.1 to about 0.6 micron as determined by the Horiba Cappa 700 particle size analyzer. Generally, any particle size distribution is acceptable, as long as the mean particle size is within the desired range, and preferably the mean particle size of finely divided microcrystalline cellulose that is substantially colloidal in particle size is less than about 10 microns.

The surfactant component is adsorbed onto the surfaces of the substantially colloidal, cellulose particles to function as a barrier to prevent formation of hydrogen or cellulosic bonds between the finely divided cellulose particles during the drying step. Also, when the powder aggregate is dispersed in an aqueous liquid or in an oil-based liquid, e.g., in a liquid oil, the surfactant acts as a dispersant to reconstitute and homogeneously disperse the finely divided cellulose and to aid in forming a three-dimensional network of finely divided, substantially colloidal, cellulose particles in the liquid.

In liquid oil systems, certain concentrations of the finely divided cellulose-surfactant particles in the liquid oil will form a stable gel; the gel formation is driven by the cellulose-surfactant combination and is independent of the chemical identity of the oil.

This invention also concerns the preparation of the texturizing, stabilizing, gelling and bulking composition which contains finely divided cellulose coprocessed with specific surfactants to physically modify the surface characteristics of the cellulose in the resultant aggregates. The surface characteristics of the finely divided cellulose may be modified by the presence of the coprocessed surfactant, being either more hydrophilic or more lipophilic in nature, by selection of specific surfactants, as described below, for adsorption on the surface of the cellulose. For example, in lipid systems, a surfactant that exhibits lipophilic properties may be coprocessed with the finely divided cellulose, and the selection of such a surfactant facilitates the preparation of a dry, reconstitutable powder aggregate which readily disperses in a lipid environment to nearly original finely divided size and at sufficient concentrations form three-dimensional networks which structure liquid oils.

The term "cellulose" as used herein includes finely divided cellulose such as microcrystalline cellulose ("MCC"), prepared according to the hydrolysis preparation procedure described in Durand et al., U.S. Pat. No. 3,539,365 and Battista, U.S. Pat. No. 2,978,446. The effective functionality of the cellulose will depend on the surface area of the dispersed colloidal material, i.e., the greater the surface area the more effective is the material in dispersion.

Other useful cellulosic materials include powdered cellulose or cellulose obtained from non-woody plant sources such as wheat shafts, oat hulls, corn stalks and the like. These are potential sources of finely divided cellulose provided the size of the cellulose particles is appropriately reduced in size. This can be accomplished effectively by the use of wet or dry mechanical shear, chemical degradation treatment, or a combination thereof. The particle shape may be rod-shaped, round, spherical, platelet or irregular, dependent upon the processing methods or cellulose material, but is preferably rod-shaped to facilitate formation of the three-dimensional network once fully dispersed at sufficient concentrations to obtain a stable network.

The term "surfactant" denotes a chemical moiety with a measurable HLB (hydrophilic/lipophilic balance) within the range of from about 1 to about 40. A surfactant has at least two types of moieties, a hydrophilic moiety and a hydrophobic moiety. Although HLB was developed as a means for categorizing emulsifiers according to their tendency to form emulsions containing oil and water, the HLB system has been and here is applied to surfactants including surface active agents, emulsifiers, wetting agents, and dispersants. Generally, the lower the HLB is, the greater is the tendency for the surfactant to dissolve in oil, and the higher the HLB is, the greater is the tendency for the surfactant to dissolve in water. A low HLB surfactant, about 2 to about 8, is usually oil soluble; a high HLB surfactant of about 13 and greater is usually water-soluble; while an intermediate HLB surfactant has intermediate tendencies. This system which was developed by Griffin at ICI America is now a widely accepted empirically derived standard; it is used to help select an alternative surfactant based on the HLB of the surfactant being used. It is also used to select a group of surfactants, which has a net HLB within the needed range, even though the members of group individually may not have the needed HLB.

The term "surfactant" is meant to include food-grade surfactants and/or emulsifiers of HLB range about 1 to about 40 and blends or mixtures of two or more of the foregoing, useful in structuring lipid food systems and/or texturizing, stabilizing or bulking aqueous-based reduced fat or nonfat food systems. The surfactants of this invention have an HLB within the range of from about 1 to about 40; preferably within the range of from about 1 to about 25. For coprocessed cellulose-surfactant compositions intended for lipid-based food systems, the HLB of the surfactant is preferably within the range of about 2 to about 13; and more preferably within the range of from about 5 to about 9. For coprocessed cellulose-surfactant compositions intended for use in aqueous-based food systems, the HLB of the surfactant is preferably within the range of about 2 to about 21.

Useful surfactants and/or emulsifiers according to the invention include, without limitation, lecithin, monoglycerides, mono- and diglycerides, acetylated monoglycerides, ethoxylated monoglycerides, sorbitan esters, sucrose esters, monostearates, monoglyceride or diglyceride esters, including esters of acids such as acetic acid, lactic acid and succinic acid and including diacetyl tartaric acid esters of mono- or diglycerides, propylene glycol monoesters, polyglycerol esters of fatty acids, polysorbates, and sodium stearoyl lactylate. Mixtures or blends of two or more of any of the foregoing may be useful according to the invention. A highly preferred surfactant for cellulose-surfactant compositions intended for use in lipid-based food systems is sorbitan monostearate. A highly preferred surfactant for those compositions intended for use in aqueous-based food systems is sodium stearoyl lactylate.

For lipid-based food systems, the surfactants are characterized in that the resultant structural lipid systems have a viscosity of at least about 10,000 cps, preferably at least about 15,000 cps, and most preferably at least about 18,000 cps, at a minimum solids content.

The dry free flowing cellulose-surfactant aggregate of this invention contains two essential components, surfactant and finely divided cellulose. The cellulose-surfactant composition may, however, contain other materials in minor amounts, i.e., less than 10% by weight and preferably less than 5% by weight. Such other materials may include, for example, a hydrocolloid material that is coprocessed in minor amounts with the surfactant and the finely divided cellulose. Hydrocolloids are naturally occurring colloidal products, typically gums such as sodium carboxymethyl cellulose (CMC), carrageenan, pectin, agar, guar, and locust bean gum, which have hydrophilic moieties, but not hydrophobic moieties. Hydrocolloids can disperse in water to produce a colloidal system. They are sometimes used as protective colloids or as stabilizers for emulsions and suspensions. Some have also been processed with cellulose. In the present invention, hydrocolloids are preferably absent from the coprocessed surfactant-containing cellulose aggregate.

Coprocessing to form the aggregated compositions of this invention is accomplished by any of several physical processes. These include coprocessing cellulose with an emulsion, a suspension, or a solution of surfactant. Suitable processes, alone or in combination, include intensive wet co-milling or homogenization of cellulose and surfactant, high intensity mixing of cellulose and surfactant using a Henschel, Littleford-Day or other suitable mixer, co-extrusion of the cellulose and the surfactant, using any one of a number of commercially available extruders, and subsequent drying in a spray dryer, bulk co-drying using a fluid bed dryer or some other suitable dryer, air drying, freeze drying, or spray chilling of co-emulsified or co-suspended cellulose and surfactant using a suitable spray chiller. When wet-processed, the liquid may be water, a non-aqueous solvent such as alcohol, or a mixture thereof. Agents that improve the compatibility of the components may also be used in any of the above processes. A preferred process includes high-intensity mixing of the finely divided cellulose with the surfactant in an aqueous medium, followed by co-drying, preferably by spray drying, to remove the water to form a coprocessed product.

Coprocessing is required. The simple blending of cellulose and surfactant is not sufficient to produce the novel cellulose compositions of this invention. To form such a composition, the surfactant must be free to flow onto the surface of the cellulose. Such flow can occur near, at, or above the melting temperature of the surfactant or it can occur if the surfactant is in solution or if the surfactant is dispersed or emulsified. A typical process used for making the compositions of this invention involves high shear with a temperature that is sufficient to melt, to soften, or to otherwise improve the flow characteristics of the surfactant. The intensity must be sufficient to force association between the hydrophilic surface of the finely divided cellulose, and at least the less hydrophobic part of the surfactant molecule, requiring a significant energy input, either mechanically or through a solvent system.

As a general rule, the more uniform the distribution of surfactant is throughout the surfactant-cellulose system being coprocessed, the better the performance characteristics of the resultant composition. Uniform distribution of the surfactant is desirable for ensuring that individual particles of cellulose become coated with the surfactant. A high degree of surfactant distribution leads to a more effective use of the surfactant on the cellulose and it leads to a more uniform particle size distribution for the coprocessed cellulose-surfactant composition, i.e., the aggregates. A more uniform particle size distribution provides greater quality control in the food or other end product for the cellulose-surfactant composition. Generally, the finer the surfactant dispersion or the greater the degree of emulsion in the coprocessing, the better the aggregated product will be in its performance characteristics. Coprocessing creates a physical interaction between the cellulose particle and the surfactant; however, it is hypothesized that it generally does not tend to create covalent chemical bonding.

It is critical to the invention that the resulting compositions of finely divided cellulose coprocessed with surfactant be recovered as a substantially dry, free flowing cellulose product. The cellulose-surfactant composition should have a maximum moisture content of less than about 10% by weight, preferably in the range of about 1% to about 7% by weight, and most preferably in the range of about 2% to about 5% by weight. The recovery process, whether by drying to remove aqueous or nonaqueous solvent or by cooling to solidify molten surfactant in the coprocessed aggregates, fixes the surfactant onto the surface of the cellulose in a manner that tends to prevent, or at least retard, its being stripped from the surface of the cellulose by solvent. The resulting dry composition is a free flowing powder.

The dry free flowing coprocessed product is an aggregate of substantially colloidal cellulose, preferably a microcrystalline cellulose, and a surfactant. The size of the aggregate, as distinct from the finely divided particles of cellulose in the aggregate, is dependent upon the method of manufacture, however, and generally the mean size will range from about 5 to about 100 microns. Preferably, the aggregate will have a mean size of from about 10 to about 60 microns; more preferably, the aggregate will have a mean size of from about 20 to about 50 microns; and most preferably, the aggregate will have a mean size of from 20 to about 40 microns. For microcrystalline cellulose aggregates intended for use in non-lipid-based food systems, the aggregate mean size is preferably from about 5 to about 30 microns.

A processing method by which the hydrophilic surface of the finely divided cellulose is modified by the addition of a coprocessed surfactant having characteristics either hydrophobic (i.e., lipophilic) or hydrophilic in nature to one with more lipophilic characteristics, to produce a cellulose-surfactant composition intended for lipid-based food systems, involves (1) preparation of intimate colloidal mixture of highly dispersed finely divided cellulose in water, (2) the high shear emulsification of the surfactant in that same aqueous mixture, and (3) sufficient shear and/or mixing to obtain an intimate, homogeneous mixture of the finely divided cellulose particles and the fine surfactant droplets. Then, evaporation, preferably instantaneous, of the water or any other solvent present causes the surfactant to adhere to the surface of the cellulose particles. To obtain good coverage of the cellulose and to obtain most of the original particle surface area after reconstitution, thorough mixture of the components is essential. This coprocessing method is also applicable to the preparation of cellulose-surfactant compositions intended for non-lipid-based food systems by selection of a surfactant appropriate for such food system.

In lipid-based systems, powdered samples of coprocessed finely divided cellulose aggregate with a surfactant or surfactants, e.g., sorbitan monostearate, made in accordance with this invention, easily reconstitute (redisperse) to near original particle size when sheared or otherwise redispersed in a lipid such as liquid vegetable oil, indicating nearly complete coverage of the available cellulose surface. In a preferred method a bead mill is used, the horizontal bead mill providing the most effective shearing. Processing of MCC-surfactant powder in liquid vegetable oil with a horizontal bead mill produces the most effective dispersion of spray dried aggregates. Preferably the powdered aggregate-lipid mixture is mixed in a commercial blender to provide a homogeneous dispersion of the powdered aggregate, which in turn results in more effective use of the dispersing equipment, such as a bead mill.

Another aspect of the invention concerns both the amount of shearing the gelling agent-lipid undergoes and the solids content of the gelling agent-lipid, e.g., in a lipid-based food system. Coprocessing, such as spray drying an aqueous mixture of finely divided cellulose and surfactant, produces aggregates, which must be subjected to mechanical shearing by a bead mill or similar mechanical device to disaggregate particles. The number of passes through a shearing device such as a bead mill is important with regard to effecting dispersion of the powder aggregate within the lipid to impart desired structure, as is reflected by an increase in viscosity. It has been found that one or more passes, preferably from one to five passes, of the gelling agent-lipid through a shearing device such as a bead mill, are required to achieve a viscosity that reflects structure development in the oil, e.g., at least about 10,000 cps. Testing has shown a solids content of at least 10% of the gelling agent, based upon the total weight of the gelling agent-lipid component, to be effective to achieve the desired viscosity and consistency values. However, Applicants expect that certain gelling agents according to the invention can or will be effective at solids contents less than 10%.

In lipid-based systems, maintaining the original particle size (both with respect to particle size distribution and total particle surface area) of finely divided cellulose dispersed into liquid oil produces gelled forms of the liquid oils. The gels are stable and do not exhibit oil separation from the gel matrix. Soft, deformable gels have a plastic consistency readily spreadable and tend to resemble lard or vegetable shortening. In addition, a colloidal network in oil functions to maintain certain particles, e.g., salt, flavor, colors, suspended in the liquid oil. The finely divided cellulose structure also imparts heat stable form retention at high temperatures, a property that could be very useful in food products. The three-dimensional cellulose network immobilizes the oil and controls the rheology and flow properties of the oil. The cellulose-surfactant composition of this invention is also noteworthy for the absence of objectionable flavor and/or undesirable sensory characteristics when used in lipid-based food systems.

In aqueous-based (non-lipid-based) food systems, a primary application of the cellulose composition of this invention is as a stabilizer, as a low calorie bulking agent or as a texturizer, particularly in reduced fat and nonfat food systems. The cellulose-surfactant composition of this invention is consequently free of the objectionable chalky taste and mouthfeel of particulate cellulose, even when used in high concentrations in food systems. Since the cellulose-surfactant composition is a dry free flowing powder, it may advantageously be added to food systems without increasing the moisture content of such food systems.

In general, a fat- or lipid-containing food system may potentially be improved by use of the cellulose-surfactant composition of this invention to reduce the food system's fat and/or calorie content or to alter its texture.

The cellulose-surfactant composition of this invention is particularly suited for food systems that qualify as reduced fat, including low fat, or nonfat food systems. Food systems containing fat contents reduced below about 10% by weight, and more preferably below about 5% by weight, benefit from the use of the cellulose-surfactant composition, which provides many of the favorable texture and flavor characteristics normally associated with the full fat counterpart.

Suitable food systems include aqueous-based food systems, ranging from low moisture (up to about 30% by weight moisture) to mid-range moisture (about 30% to about 40% moisture) and high moisture (more than about 40% moisture) food systems that also typically contain one or more fats or oils as the lipid component.

Suitable reduced fat (including low fat and nonfat) food products for use with the cellulose composition of this invention include frozen desserts, whipped toppings, pourable dressings, viscous dressings, nondairy creamers, dairy spreads, nondairy spreads, soups, sauces, gravies, dips, puddings, extruded snacks, bakery products, yogurts, cheeses and emulsified meats.

Extruded snack food products include potato chips, cheese puffs, french fries, corn curls and the like.

Bakery products, which are typically high moisture food systems, include cakes, cookies, crackers, breads and the like.

Emulsified meats include hot dogs, sausages, lunch meats like bologna, and other similar meat products containing ground or comminuted meat.

Pourable and viscous dressings containing less than about 5% by weight fat, including nonfat dressings, are particularly suitable for use with the colloidal microcrystalline cellulose containing cellulose-surfactant composition of this invention. The sensory characteristics of such viscous and pourable dressings are remarkably good, providing the desirable properties of a conventional full-fat dressing.

In the aqueous-based (i.e., non-lipid-based) food systems described above, the cellulose-surfactant composition may be used in amounts of from about 0.1% to about 35% by weight, depending on the particular end use application. About 0.2% to about 10% by weight is preferred, while about 0.3% to about 5% by weight is most preferred. The percentage used will be a function of the amount of fat to be replaced in the food, the moisture content of the food system and whether other bulking agents are also being in conjunction with the cellulose composition of this invention. The usage level will be lower in those instances where the cellulose composition is used in conjunction with other bulking agents or where the cellulose composition is used as a bulking agent in a food that has a low fat content to begin with. The usage level will be higher where the cellulose composition is the sole bulking agent or texturizer.

Because the cellulose to surfactant ratio in the composition of the invention may be varied widely within broad limits, compatibility with a broad spectrum of food systems is readily achieved, e.g., by selection of a surfactant having an HLB value and other characteristics desired for a specific food system. The cellulose-surfactant composition exhibits many of the characteristics associated with the surfactant employed, so selection of a suitable surfactant may be guided by surfactant-emulsifier references which suggest specific end uses for particular surfactants and emulsifiers.

Methods of selecting surfactants, and some suggestions for certain food systems, are well known to those skilled in the art and can be found at p. 404 in the *CRC Handbook of Food Additives*, T. E. Furia, ed., second edition, volume I, CRC Press, Cleveland (1972). HLB is described by Rosen (*Surfactants and Interfacial Phenomena*, Wiley, N.Y., pp. 241–249 (1978). Flack and Krog, *Lipid Tech.*, 2, pp. 11–13 (1990) describe selection of emulsifiers. A list of suitable emulsifiers, and suggestions for their use in particular foods, can be found in industry listings, such as *McCutcheon's Emulsifiers and Detergents*, MC Publishing, Glen Rock, N.J.

The coprocessing of the finely divided cellulose and surfactant according to this invention results in the formation of a surfactant layer over at least part of the cellulose particles' surface. This layer, which may be either a continuous or a discontinuous layer, is sufficient to modify the general surface characteristics of the cellulose particle, and is generally lipophilic for low HLB surfactants and hydrophilic for high HLB surfactants.

As a result, the cellulose-surfactant composition permits flexibility in its end use as a texturizing and bulking agent and fat replacer in food systems. Selection of the HLB and/or other properties of the surfactant to be coprocessed with the finely divided cellulose allows the cellulose-surfactant composition to be optimized for specific food systems, especially food systems in which a reduced fat (or no fat) content is the desired objective. The same surfactant selection principles are equally applicable for cellulose-surfactant compositions intended for lipid-based food systems.

Numerous desirable attributes are provided by the cellulose-surfactant composition of this invention, particularly coprocessed finely divided microcrystalline cellulose of colloidal particle size and surfactant, when used as a texturizing and bulking agent and fat or oil replacer in reduced fat, low fat and nonfat food systems:

flavors in the food system are released and are less bound or less masked by the cellulose composition smooth flavor release flavors are uniformly melded, rather than being individually discernable flavor release is delayed, a desirable trait, but release then occurs over an extended period good mouthfeel characteristics, i.e., good meltaway and saliva mixing oil-like properties in pourable and spoonable salad dressings, e.g., oily slipperiness, oiliness, and oil aftertaste improved rheological, i.e., flow, properties that are more representative of full-fat products efficacious at low use levels with excellent surfactant dispersion in food systems absence of unnatural mouthfeel, e.g., grittiness, dryness, astringency and the like undesirable characteristics such as gumminess, stickiness and springiness are minimized.

The attributes described above are duplicative of many of the sensory characteristics provided by the presence of a fat or oil (lipid) in the full-fat version of the food system.

These positive attributes are exhibited over a wide range of cellulose-to-surfactant ratios in the coprocessed microcrystalline cellulose and surfactant composition, including the preferred ratio ranges specified earlier.

Preferred surfactants for cellulose compositions of this invention using colloidal microcrystalline cellulose and intended for use as a bulking agent or as an oil or fat replacement in reduced fat food systems are those generally characterized by having a "clean" (mild) flavor or lacking flavor (bland), which does not interfere with the natural flavors of the food system in which it is used. For food systems such as pourable or viscous salad dressings, an oil flavor inherent in the surfactant is also compatible with such food systems. As with flavor, the odor of the surfactant should also be bland, low or mild.

For food systems such as low fat and nonfat pourable and viscous dressings, the following surfactants are preferred for the coprocessed microcrystalline cellulose composition:

sodium stearoyl lactylate diacetyl tartaric esters of monoglyceride, e.g., PANODAN® 150K surfactant (Grinstead Division of Danisco Ingredients USA, Inc., New Century, Kans., U.S.A.)

hydrogenated palm oil or palm stearin, e.g., MYVEROL® SMG surfactant (Eastman Chemical Co., Kingsport, Tenn., U.S.A.)

distilled mono- and diglycerides, e.g., ATMUL® 84 surfactant (Witco Chemical Co., Memphis, Tenn., U.S.A.), and lactic acid ester of monoglycerides, e.g., LACTODAN® P22K surfactant (Grinstead Division of Danisco Ingredients USA, Inc.)

In low fat and nonfat dairy food systems, preferred surfactants for the coprocessed microcrystalline cellulose composition are:

distilled monoglycerides, e.g., MYVATEX® Mighty Soft surfactant (Eastman Chemical Co.) useful for frozen dairy desserts, and distilled monoglycerides, e.g., MYVEROL® 18–35K surfactant (Eastman Chemical Co.), in combination with a polyoxyethylene (20) sorbitan monostearate, e.g., TWEEN® 60 surfactant (ICI Americas, Inc., Wilmington, Del., U.S.A.)

In low fat emulsified food systems, a preferred surfactant in the coprocessed microcrystalline cellulose composition is sodium stearoyl lactylate, e.g., EMULSILAC® S surfactant (Witco Corporation). For general use in aqueous non-lipid-based food system, sodium stearoyl lactylate is a highly preferred surfactant for the coprocessed colloidal microcrystalline cellulose composition of this invention.

The invention can be appreciated from the following examples, which are intended as a further illustration of the invention, but not as a limitation on the scope of the invention. All parts and percentages in the examples, and throughout the specification and claims, are by weight (with weight percentages being based on the total weight of the composition referred to) and all temperatures are in degrees centigrade, unless otherwise indicated.

EXAMPLES

Example 1 a. Preparation of Finely Divided Microcrystalline Cellulose 1534 g of microcrystalline cellulose (FD-100, available from FMC Corporation, Philadelphia, Pa., U.S.A.) with a moisture content of 2–3% was dispersed in 12,103 g of distilled water with a Dispersator Mixer (propeller mixer available from Premier Mill Corp., Temple, Pa., U.S.A.) fitted with a rheostat operating at ~50 V output to make an 11% solids slurry. The dispersion was pumped with a pulsating air pump set at 1.5 cc/stroke (1.7 gal/hr) into a 1.4 liter lab scale bead mill (Dyno-Mill; Type KDL Pilot, manufactured by Willy A. Bachofen), loaded to 90% volume with zirconia grinding media (0.6–0.9 mm in diameter), which during processing was set into motion with an agitator revolving at a tip speed of 10 meters/second (m/sec). The resulting product was a viscous gel containing finely divided cellulose with a narrow particle size distribution. Particle size analysis, measured on a Horiba Cappa 700 Particle Size Analyzer, revealed that a single pass through the mill reduced the particle size of the cellulose from an initial mean of 20 microns to 0.7 micron, where 20% of the particles had a particle size below 0.25 micron.

As an alternative to preparing finely divided MCC with bead mill attrition, such finely divided cellulose microcrystals could also be obtained by chemical/mechanical treatment such as high solids attrition of hydrolyzed cellulose as described in Durand et al., U.S. Pat. No. 3,539,365.

b. Preparation of Powder 6193.1 g of finely divided MCC gel consisting of 11.2% solids, prepared with bead mill attrition, was diluted to 4.28% solids with 10004.5 g of distilled water using a LIGHTNIN® mixer (Lightnin, Rochester, N.Y., U.S.A.) and heated in a steam kettle to 93.3° C. (200° F.). 122.4 g of sorbitan monostearate (POLYCON® S60K, available from Witco Corporation, Memphis, Tenn., U.S.A.) incorporated as a barrier dispersant to finely divided MCC during the spray drying process, was melted (53° C.) in a stainless steel beaker on a Corning PC-100 hot plate. The total amount of cellulose slurry was added to a colloid mill (W 250 V-B Mill from Greerco Corporation), operating at 100 volts output (frequency of 62.5 Hz) and set with the gap clearance at 10 mil (0.010 inch or 0.25 mm). A LIGHTNIN® mixer attachment was affixed to the colloid mill holding tank to eliminate dead areas of mixing. Sorbitan monostearate was slowly added to the cellulose slurry, and the mixture was milled for ten minutes. The final composition, with a batch size of 16320 g, was 5% solids comprised of an 85:15 ratio of finely divided MCC-sorbitan monostearate. The resulting slurry was homogenized one pass at 3000 psi (2500 psi 1st stage, 500 psi 2nd stage) with a two stage homogenizer (APV Gaulin Inc.) and spray dried at inlet and outlet temperatures of 185° C. and 105° C., respectively, with a 3 ft. Stork-Bowen spray dryer fitted with a spray nozzle atomizer (air pressure 90 psi) to yield 357 g of a fine free flowing powder with a moisture content of 3.3%.

c. Reconstitution of Powder into Liquid Oil

Wetting cellulose aggregates in liquid soybean oil was the first step directed toward reconstitution. 300 g of powder prepared in Example 1b was dispersed in 1700 g of pure soybean oil (A&P brand) with a five liter Commercial Heavy Duty WARING® blender set to the medium speed setting and fitted with a rheostat operating at 50 volts output for ten minutes, and the resulting mixture of 15% solids content was subsequently subjected to the bead mill loaded with the same type and amounts of milling media and processing conditions described in Example 1a. After a single pass, the viscosity of the oil system increased from an initial 210 cps (thin fluid), where powder was merely dispersed in oil with a WARING® blender, to $8.25 \times 10^3$ cps (thick and slightly gelled). Maximum viscosity build-up ($27.5 \times 10^3$ cps) was obtained after two passes as measured by Brookfield Viscometer (spindle #6; 20 rpm; one minute; 25° C.). Samples diluted to 10% solids content and passed through the bead mill for a third pass were reduced with respect to viscosity to 17.4×10³ cps whereas an additional fourth pass at 10% solids content resulted in an increase in viscosity to 22.4×10³ cps. Additional dilutions, down to 5% solids content, and processing through a fifth pass, resulted in a drastic decrease in viscosity (2.7×10³ cps). Multiple passes at this solids level did not change the viscosity of the system.

Figure 1:
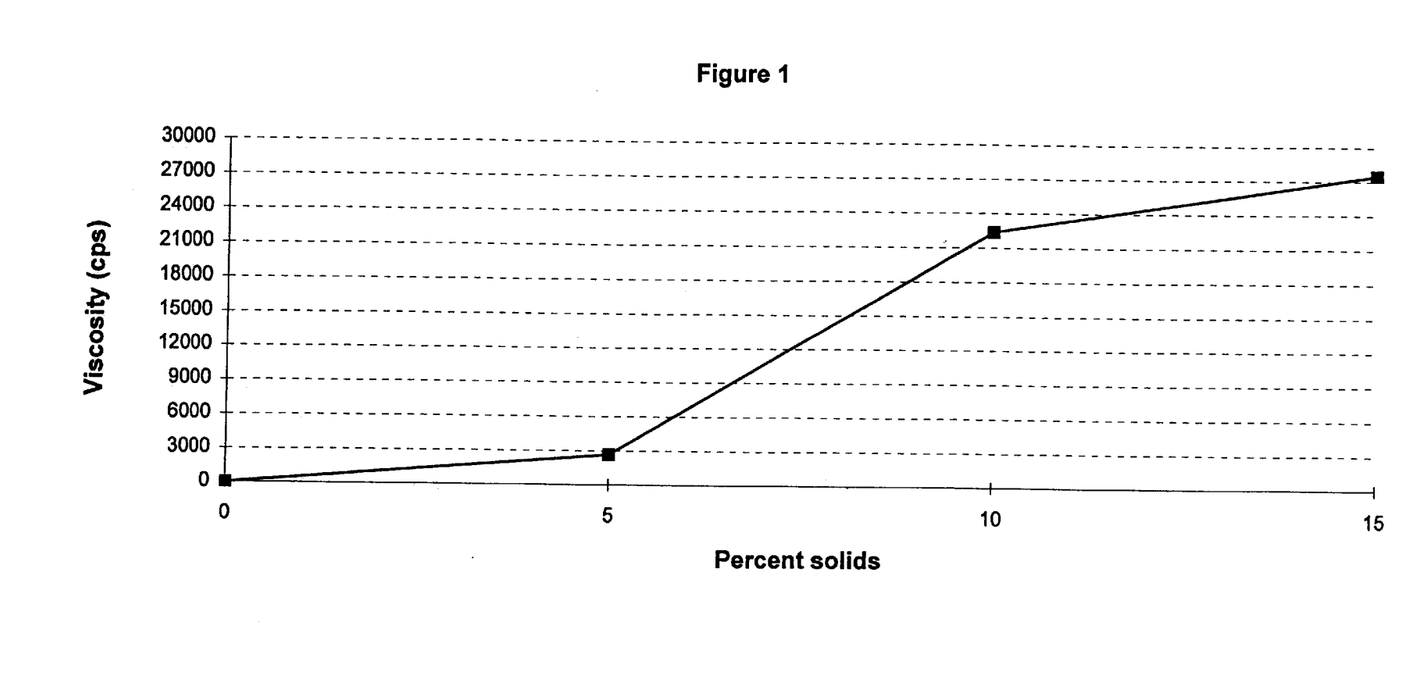
FIG. 1 is a graphic representation of the relationship of the viscosity of coprocessed (aggregated) finely divided microcrystalline cellulose (MCC) and sorbitan monostearate (SMS), in an 85:15 ratio, in liquid oil as a function of solids content.

A graphic depiction of the maximum viscosities reached at 5%, 10%, and 15% solids content, respectively, is set forth in FIG. 1.

Example 2 a. Surfactant Types

Example 1c describes the liquid oil texturizing capabilities of product comprised of finely divided MCC and sorbitan monostearate. Alternative surfactants with various chemical structures and HLB values were screened in the same manner as was sorbitan monostearate regarding their ability to structure liquid oils. The following describes the coprocessing of PANODAN®150 (blend of diacetyl tartaric acid ester of monodiglyceride and other mono- and diglycerides, available from Grinstead Division of Danisco Ingredients USA, Inc., New Century, Kans., U.S.A.) with finely divided MCC and the characterization of the inherent oil structuring properties.

b. Powder Preparation:

6193.1 g of finely divided MCC gel consisting of 11.2% solids, was diluted to 4.28% solids with 10,004.5 g of distilled water using a LIGHTNIN® mixer, and the resulting slurry was heated in a steam kettle to 93.3° C. (200° F.). 122.4 g of PANODAN® 150 were melted (56° C.) in a stainless steel beaker on a Corning PC-100 hot plate. The total amount of the cellulose slurry was added to a colloid mill (W 250 V-B Mill), operating at 100 volts output (frequency of 62.5 Hz) and set with the gap clearance at 10 mil (0.25 mm). A LIGHTNIN® mixer attachment was affixed to the colloid mill holding tank to eliminate dead areas of mixing. PANODAN® 150 was slowly added to the cellulose slurry, and the mixture was milled for 10 minutes. The final composition, with a batch size of 16320 g, was 5% solids content comprised of an 85:15 ratio of finely divided MCC-PANODAN® 150. The resulting slurry was homogenized one pass at 3000 psi (2500 psi 1st stage, 500 psi 2nd stage) with a two-stage homogenizer (APV Gaulin Inc.) and spray dried at inlet and outlet temperatures of 185° C. and 105° C., respectively, with a 3 ft. Stork-Bowen Spray dryer fitted with a spray nozzle atomizer (air pressure 90 psi) to yield 441 g of fine free flowing powder with a moisture content of 3.3%.

c. Reconstitution of Powder into Liquid Oil 300 g of finely divided MCC-PANODAN® 150 powder from Example 1b was dispersed in 1700 g of pure soybean oil (A&P brand) with a five liter Commercial Heavy Duty WARING® blender set to the medium speed setting and fitted with a rheostat operating at 50 volts output for 10 minutes, and the slurry produced was subsequently subjected to the bead mill charged with 90% zirconia media. The oil slurry was pumped through the mill at a feed rate of 1.7 gallons/hour. After a single pass, the viscosity of the oil system increased from an initial 210 cps (thin fluid) to 6.55×10³ cps (thick and slightly gelled). Maximum viscosity build-up (22.2×10³ cps) was obtained after two passes as measured by Brookfield Viscometer (spindle #6; 20 rpm; one minute; 25° C.). Samples diluted to 10% solids content and passed through for a third pass were reduced in terms of viscosity to 12.6×10³ cps, whereas an additional fourth pass at 10% solids resulted in an increase to 14.8×10³ cps. Additional dilutions, down to 5% solids content, and processed through a fifth pass, resulted in drastic decreases in viscosity (2.2×10³ cps). Multiple passes at this solids level did not change viscosity of the system.

Example 3

Surfactant Blends a. Powder Preparation:

6193.1 grams of colloidal MCC gel consisting of 11.2% solids prepared using the same method as described in Example 1a, was diluted to 4.28% solids with 10,004.5 g of distilled water using a LIGHTNIN® mixer and heated in a steam kettle to 93.3° C. (200° F.). 24.5 g of DURFAX® 60 (polysorbate 60, available from Van den Berg Foods Company, Lisle, Ill.) was added to 97.9 g of sorbitan monostearate in a stainless steel beaker. The surfactant blend was melted (53° C.) on a Corning PC-100 hot plate and hand stirred to obtain a homogenous mixture. The whole amount of cellulose slurry was added to a colloid mill (W 250 V-B Mill from Greerco Corporation), operating at 100 volts output (frequency of 62.5 Hz) and set with the gap clearance at 10 mils. A LIGHTNIN® mixer attachment was affixed to the colloid mill holding tank to eliminate dead areas of mixing. The surfactant blend was slowly added to the cellulose slurry and milled for 10 minutes, where the final composition, with a batch size of 16320 g, was 5% solids comprised of an 85:12:3 ratio of colloidal MCC-sorbitan monostearate-polysorbate 60. The resulting slurry was homogenized one pass at 3000 psi (2500 psi 1st stage, 500 psi 2nd stage) with a two stage homogenizer (APV Gaulin Inc.) and spray dried at inlet and outlet temperatures of 185° C. and 105° C., respectively, with a 3 ft Stork-Bowen spray dryer fitted with a spray nozzle atomizer (air pressure 90 psi) to yield 355 g of fine free flowing powder with a moisture content of 3.3%.

b. Reconstitution of Powder into Liquid Oil 300 g of colloidal MCC-sorbitan monostearate-polysorbate 60 powder (85:12:3) was dispersed in 1700 g of pure soybean oil (A&P brand) with a 5 liter Commercial Heavy Duty WARING® blender set to the medium speed setting and fitted with a rheostat operating at 50 volts output for 10 minutes and was subsequently subjected to the bead mill charged with 90% zirconia media. The oil slurry was pumped through the mill at a feed rate of 1.7 gallons/hour. After a single pass, the viscosity of the oil system increased from an initial 230 cps (thin fluid) to 24.0×10³ cps (thick and gelled). Maximum viscosity build-up (36.5×10³ cps) was obtained after two passes as measured by Brookfield Viscometer (spindle #6; 20 rpm; one minute; 25° C.). Samples diluted to 10% solids content and passed through for a third pass were reduced in terms of viscosity to 11.4×10³ cps, whereas an additional, fourth pass at 10% solids content resulted in an increase to 16.8×10³ cps. Additional dilution, down to 5% solids content, and processed through a fifth pass, resulted in a drastic decrease in viscosity (3.6×10³ cps). Multiple passes at this solids level did not change viscosity of the system.

Other surfactants were coprocessed with finely divided MCC and reconstituted in oil using the same procedures described with respect to POLYCON® S60K and PANODAN®150. The results are set forth in the table below, where "MP" represents the melting point of the surfactant and "Shear" represents the number of passes through a bead mill required to achieve full dispersion of powder aggregate in oil, as determined by optimum viscosity:

TABLE

CHARACTERISTICS OF CERTAIN SURFACTANTS AND THEIR FUNCTIONALITY IN LIPID SYSTEMS

| Chemical type | HLB | MP (° C.) | Highest viscosity reached in Oil (15%) | Shear |
|---|---|---|---|---|
| Sorbitan Monostearate-polysorbate 60 (80:20) (POLYCON ® S60K-DURFAX ® 60) | 6.7 | 53 | 36,500 cps | 2 passes |
| Sorbitan Monostearate (POLYCON ® S60K) | 4.7 | 53 | 27,500 cps | 2 passes |
| Diacetyl Tartaric Acid Ester of Monodiglycerides (PANODAN ® 150) | 7–8 | 56 | 22,250 cps | 2 passes |
| Polyglycerol Ester (SANTONE ® 3-1-SXTR) | 7.2 | 52–57 | 22,250 cps | 3 passes |
| Ethoxylated Monodiglycerides (TALLY ® 100) | 7.7 | 54–58 | 20,000 cps | 3 passes |
| Acetylated Monodiglycerides (MYVACET ® 9-45) | 4.5 | liquid at room temp. | 10,600 cps | 6 passes |
| Polysorbate 60 (DURFAX 60) | 14.9 | liquid at room temp. | 16,700 cps | 5 passes |
| Sodium Stearoyl Lactylate (EMULSILAC ® SK) | 21 | 49 | 26,750 cps | 3 passes |
| Distilled Monoglycerides (DIMODAN ® OK) | 4.3 | 60 | 19,500 cps | 2 passes |
| Lecithin (EMULPUR ® N-P1 (deoiled soybean lecithin) 33% PC) | 4–5 | 60–65 | 13,500 cps | 3 passes |
| Lecithin (MC-Thin AF-1/DB (natural soybean lecithin) 10% PC) | 4–5 | liquid at room temp. | 21,000 cps | 3 passes |
| Partially Hydrogenated Fat* (KAOMEL ® ) *(control) | — | 36 | 5,300 cps | 5 passes |
| Propylene Glycol Monostearate (MYVEROL ® P-06K) | 4.5 | 45 | 8,250 cps | 5 passes |
| Sucrose Polyester (RYOTO ® ER-190) | 1 | liquid at room temp. | 1,020 cps | 4 passes |
| Polyglycerol Esters of Ricinoleic Acid (TRIODAN ® R-90) | Unkw | liquid at room temp. | 1,580 cps | 4 passes |

Example 4
Cellulose Types

Alternative grades or types of cellulosic material were investigated as to their ability to function with surfactants and to gel liquid oil. 1,002.7 g of an experimental hydrolyzed cellulose prepared from paper-grade wood pulp, with a moisture content of 4.8% was dispersed in 12634.3 g of distilled water with a Dispersator Mixer (propeller mixer from Premier Mill Corp. Temple, Pa., U.S.A.) fitted with a rheostat operating at ~50 V output to make a 7% solids slurry. The dispersion was pumped with a pulsating air pump set at 1.5 cc/stroke (1.7 gal/hr) into a 1.4 liter lab scale bead mill (Dyno-Mill; Type KDL Pilot), loaded to 90% volume with zirconia grinding media (0.6–0.9 mm in diameter), which during processing was set into motion with an agitator revolving at a tip speed of 10 m/sec. The resulting product was a thick gel comprised of finely divided cellulose particles. By use of the same procedure, SOLKA-FLOC® 200FCC, an unhydrolyzed grade of cellulose available from Fiber Sales & Development Corporation, Urbana, Ohio, U.S.A. was attrited in the bead mill at 5% solids concentration.

Both cellulose materials were separately coprocessed with sorbitan monostearate to obtain a reconstitutable powder using the procedure below, which is specific for the experimental hydrolyzed cellulose. 10,000.0 g of finely divided MCC gel obtained by bead mill attrition of experimental hydrolyzed cellulose consisting of 6.8% solids, was diluted to 4.28% solids with 5880 g of distilled water using a LIGHTNIN® mixer and heated in a steam kettle to 93.3° C. (200° F.). 120.0 g of sorbitan monostearate (POLYCON® S60K) was melted (53° C.) in a stainless steel beaker on a Corning PC-100 hot plate. Cellulose slurry was added to a colloid mill (W 250 V-B Mill), operating at 100 volts output (frequency of 62.5 Hz) and set with the gap clearance at 10 mil. A LIGHTNIN® mixer attachment was affixed to the colloid mill holding tank to eliminate dead areas of mixing. Sorbitan monostearate was added slowly to the cellulose slurry, and the resulting mixture was milled for ten minutes. The final composition, with a batch size of 16,000 g, was 5% solids comprised of an 85:15 ratio of experimental finely divided MCC-sorbitan monostearate. The resulting slurry was homogenized one pass at 3000 psi (2500 psi 1st stage, 500 psi 2nd stage) with a two-stage homogenizer (APV Gaulin Inc.) and spray dried at inlet and outlet temperatures of 185° C. and 105° C., respectively, with a 3 ft Stork-Bowen spray dryer fitted with a spray nozzle atomizer (air pressure 90 psi) to yield a fine free flowing powder with a moisture content of 3.0%. With the exception of spray drying at a total solids concentration of 3%, the sample containing SOLKA-FLOC® was processed in the exact same manner.

After reconstitution of samples in liquid oil via bead mill, both grades of cellulose functioned equally well with sorbitan monostearate (SMS) to gel the lipid system. 300 g of each powder was separately dispersed in 1700 g of pure soybean oil (A&P brand) with a five liter Commercial Heavy Duty WARING® blender fitted with a rheostat operating at 50 volts output for ten minutes, and the resulting mixture was subsequently subjected to the bead mill. The dispersion was pumped with a pulsating air pump set at 1.5 cc/stroke (1.7 gal./hr) into a 1.4 liter lab scale bead mill (Dyno-Mill; Type KDL Pilot), loaded to 90% volume with zirconia grinding media (0.6–0.9 mm in diameter), which during processing was set into motion with an agitator revolving at a tip speed of 10 m/sec. Milling SOLKA-FLOC®-SMS in oil a total of four passes viscified soybean oil from an initial 230 cps to $21.2 \times 10^3$ cps as measured by a Brookfield viscometer (spindle #6; 20 rpm; one minute; 25° C.). The powder consisting of experimental hydrolyzed cellulose-SMS exhibited the same properties as SOLKA-FLOC®-SMS. The latter experiment indicates that alternate grades of cellulose can provide comparable results as FD-100 cellulose to function as a component to thicken or gel liquid oils.

Example 5
Texturizing Capabilities in Other Fat Types

Figure 2:
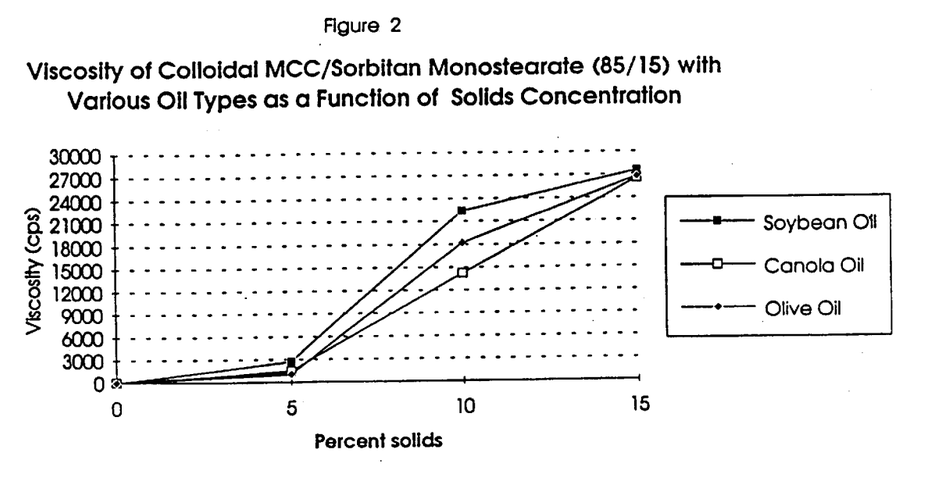
FIG. 2 is a graphic representation of the viscosity of coprocessed (aggregated) MCC/SMS in an 85:15 ratio dispersed in various vegetable oils as a function of solids content.

Previous examples of reconstituting finely divided MCC-surfactant powders in oils have all focused on one type of oil, namely, 100% soybean oil. Three additional fats, canola oil (Hollywood brand), which has a lower degree of saturated fat than soybean oil, olive oil (Cento brand), approximately the same degree of saturation as soybean oil, and KAOMEL®, a partially-hydrogenated vegetable oil (cottonseed and soybean oil, available from Van den Berg Foods Co., Lisle, Ill., U.S.A.), were also tested for their ability to be texturized by reconstituting finely divided MCC-SMS powder following the same techniques as in Example 1c. A graphic representation of the results obtained with regard to soybean oil, canola oil, and olive oil, is set forth in FIG. 2.

In the sample containing canola oil and 15% finely divided MCC-SMS powder, the viscosity, in a total of two passes, increased from 250 cps to $26.5 \times 10^3$ cps. At 15% solids concentration, olive oil was structured to the same extent. In a total of two passes, the viscosity increased from 270 cps to $27.2 \times 10^3$ cps. As found in Example 1c, the viscosity of soybean oil was as high as $27.5 \times 10^3$ cps. Results indicate that regardless of liquid oil type, finely divided MCC-SMS powder functions equally well to structure these oil systems.

Slight procedural modification was required to reconstitute the powder aggregate in a high melting fat such as KAOMEL®. The following is the procedure used to reconstitute 15% colloidal MCC-SMS powder aggregate into KAOMEL®: 1700 g of KAOMEL® was melted on a Corning PC-100 hot plate (70° C.) in a 4000 ml stainless steel container. 300 g of colloidal MCC-SMS (85:15) powder aggregate was dispersed in the molten fat phase with a LIGHTNIN® mixer operating at 1300 rpm for ten minutes. To maintain heat to the slurry, the feed tank to the bead mill was heated with electrothermal tape. The dispersion was pumped with a pulsating air pump set at 1.5 cc/stroke (1.7 gal/hr) into a 1.4 liter lab scale bead mill (Dyno-Mill; Type DKL Pilot manufactured by Willy A. Bachofen), loaded to 90% volume with zirconia grinding media (0.6 to 0.9 mm in diameter), which during processing was set into motion with an agitator revolving at a tip speed of 10 m/sec. Two consecutive passes were achieved before the fat phase began to solidify, thus hampering further passes. It was essential that the slurry temperature remained higher than the melting point of KAOMEL® to insure proper milling operations.

KAOMEL®, in the melted form, was structured-gelled by reconstituting finely divided MCC-SMS powder aggregate in the bead mill. This material, when cooled, has the appearance of pure KAOMEL®. However, upon melting the appearance of this fat system was noticeably different. Whereas pure KAOMEL® melts to a clear liquid, the sample containing finely divided MCC-SMS melted to form a gel. At temperatures substantially higher than the melting point of KAOMEL®, the gel structure remains stable.

Example 6

Surfactant Levels

The ratio of surfactant to MCC was examined in order to determine the minimum amount of surfactant required to effectively function as a barrier dispersant for finely divided cellulose. Three ratios of colloidal MCC and sorbitan monostearate were studied: 85:15, 90:10, 95:5. Other than altering surfactant levels in the samples, powder preparation and reconstitution in liquid oil was accomplished in the same manner as Example 1. Viscometric profiles of each sample are depicted in the graph of viscosity vs. applied shear (number of passes) set forth in FIG. 3.

Figure 3:
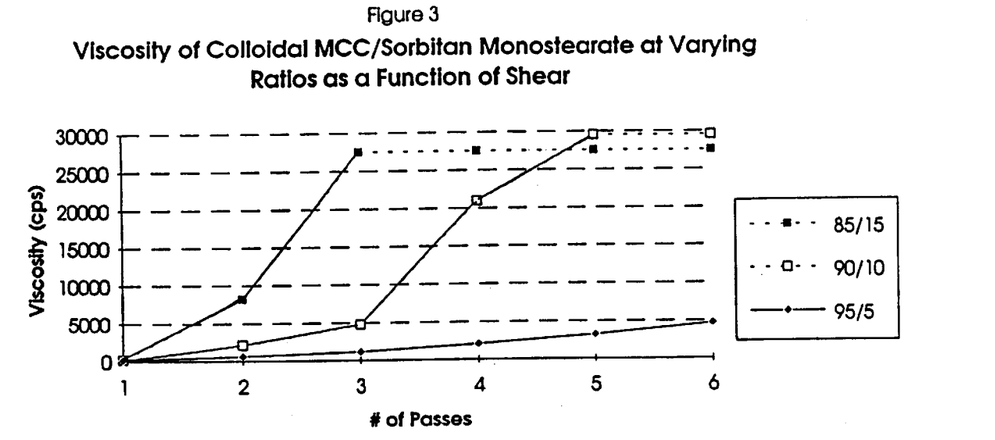
FIG. 3 is a graphic representation of the viscosities of MCC/SMS compositions at varying ratios according to the invention versus applied shear.

It is evident from the profiles plotted on the graph of FIG. 3 that finely divided cellulose requires between 10% and 5% surfactant, based upon the weight of cellulose, to function as a barrier and to prevent individual cellulose crystals from bonding. 5% surfactant, clearly observed in the graph of FIG. 3 indicates that aggregated cellulose particles could not be dispersed after six consecutive passes through the bead mill whereas 10% surfactant begins to disperse between 2 and 3 passes, indicating barrier dispersant characteristics. An even more effective barrier is portrayed with 15% surfactant dispersing between 1 and 2 passes. It should be noted, for FIG. 3 that the last viscosity points for the 85:15 and 90:10 samples are shown to level off between 25000 cps and 30000 cps. These last viscosity points are estimates represented by dotted lines because the samples thickened to the point where pumping became difficult, thus impeding further passes. In actuality, viscosities may be higher with additional passes rather than level off as depicted on the graph in FIG. 3.

Example 7

Other than solely behaving as a barrier dispersant to finely divided MCC particulates during the drying process as described in Example 2, the surfactant also functions as a synergistic ingredient with cellulose to structure liquid oil. This property was demonstrated by experimentation conducted with larger sized MCC particles (6 microns) coprocessed with sorbitan monostearate at a 90:10 ratio and reconstituted in liquid oil. The reason that the larger sized MCC particles were used rather than the finely divided cellulose is that the 6 microns particle size powder cellulose used was the smallest particle size dry cellulose powder available for this test.

a. Powder Preparation 1846.2 g of FD-006 microcrystalline cellulose (6 microns, available from FMC Corporation, Philadelphia, Pa., U.S.A.) with a moisture content of 2.5% was dispersed with a LIGHTNIN® mixer in 11287.2 g of distilled water heated to 93.3° C. (200° F.) via steam kettle. 200 g of sorbitan monostearate was melted (53° C.) in a stainless steel beaker on a Corning PC-100 hot plate. The total amount of cellulose slurry was added to a colloid mill operating at 100 volts output (frequency of 62.5 Hz) and set with the gap clearance at 10 mil (0.25 mm). A LIGHTNIN® mixer attachment was affixed to the colloid mill holding tank to eliminate dead areas of mixing. Sorbitan monostearate was slowly added to the cellulose slurry, and the resulting mixture was milled for 10 minutes. The final composition, with a batch size of 13,333.3 g, was 15% solids comprised of a 90:10 ratio of FD-006-sorbitan monostearate (SM). The resulting slurry was homogenized one pass at 3000 psi (2500 psi 1st stage, 500 psi 2nd stage) with a two-stage homogenizer (APV Gaulin Inc.) and spray dried at inlet and outlet temperatures of 160° C. and 85° C., respectively, nozzle atomizer (air pressure 90 psi) to yield 1160 g of free flowing powder with a moisture content of 4.5%.

b. Reconstitution in Liquid Oil 300 g of 85:15 FD-006-SM powder was dispersed in 1700 g of pure soybean oil (A&P brand) with a five liter Commercial Heavy Duty WARING® blender set to the medium speed setting fitted with a rheostat operating at 50 volts output for 10 minutes, and the resulting mixture was subsequently subjected to the bead mill loaded with the same type and amounts of milling media and processing conditions described in Example 1a. After a single pass, the viscosity of the oil system increased from an initial 200 cps (thin fluid), to $1.79 \times 10^3$ cps. Maximum viscosity build-up ($13.0 \times 10^3$ cps) was obtained after seven passes as measured by Brookfield Viscometer (spindle #6; 20 rpm; one minute; 25° C.). Neither FD-006 nor surfactant, milled separately in soybean oil at same concentrations found in the coprocessed powder, generated significant viscosity build-up in liquid oils. The recorded viscosity for the cellulose sample milled in the bead mill at 15% solids was 660 cps, and the viscosity of the surfactant milled at 1.5% solids was measured at 130 cps, evidence that MCC and sorbitan monostearate are synergistic with each other in structuring liquid oils.

Example 8
Suspension Properties of Oil Gels

Five 50 ml samples of soybean oil structured or gelled with colloidal MCC-sorbitan monostearate (85:15) powder using techniques described in Example 1c at various solids contents (15%, 10%, 5%, 3.5%, and 2.5%) were placed in 50 ml graduated cylinders. 1 g of food colored granulated sugar crystals were mixed into the oil systems by hand stirring and observed over a two week period at room temperature for indications of sugar particle sedimentation. At the end of two weeks, the lipid systems consisting of 15%, 10%, 5%, and 3.5% solids concentrations showed no signs of sugar crystal sedimentation. The sample comprised of 2.5% solids did not exhibit a gel matrix strong enough to maintain the suspension of sugar crystals. Within seconds after sugar crystals were mixed into this particular sample, the particles were observed falling out.

Example 9
Heat Stability 200 g of liquid soybean oil, structured or gelled with 15% colloidal MCC-sorbitan monostearate (85:15) powder prepared according to the techniques described in Example 1c was placed on a frying pan and slowly heated on a Corning PC-100 hot plate to determine the heat stability of the gel. The temperature was recorded with a Fluke 52 K/J thermometer, and the consistency of the gelled oil and changes were recorded at 10° F. intervals up to 250° F. For temperatures up to 160° F. the consistency of the texturized lipid system appeared unaltered from the original form. At 165° F. the gel system became noticeably more viscous, actually thickening with increasing temperatures, and remained at that consistency through the duration of the heating cycle (to 250° F.). The lipid system did not reveal any signs of instability or change in consistency at elevated temperature. Rheologically controlled liquid oils could be useful in toaster products, extruded snacks, and batter coatings.

Example 10

This Example describes the preparation of a dry, free flowing cellulose aggregate containing finely divided cellulose of colloidal particle size and surfactant in intimate admixture, in an 80:20 weight ratio of microcrystalline cellulose to surfactant. The surfactant is sodium steoryl lactylate.

The cellulose source is attrited microcrystalline cellulose wetcake, obtained from hydrolyzed wood pulp and having a particle size range of from 0.1 micron to about 10 microns, 50% of which has a particle size below about 0.2 micron. The attrited microcrystalline cellulose wetcake has a solids content of about 38 to about 44%.

The sodium stearoyl lactylate surfactant is EMULSI-LAC® SK surfactant available from Witco Corporation, Memphis, Tenn., U.S.A., with an HLB of 20, and is employed in weight ratio of about 80:20 microcrystalline cellulose to surfactant.

Coprocessing of the microcrystalline cellulose and surfactant is carried out as follows. Deionized water, in an amount of 11.3 kg, is placed in a Gifford Woods colloid mill first heated to about 93° C. (about 200° F.) with boiling water. Attrited microcrystalline cellulose wetcake, as described above and in an amount of 3.810 kg, is dispersed in the water by operation of the colloid mill at about 5,000 rpm (a rheostat setting of 70%) and 40.5 mil (1.03 mm) clearance. Mixing is also aided by a LIGHTNIN® mixer inserted in the hopper of the colloid mill. Milling is continued for about 10–15 minutes to fully disperse the microcrystalline cellulose.

During the dispersion of the microcrystalline cellulose in the colloid mill, 400 g sodium stearoyl lactylate is melted in a separate container at a temperature of about 71° C. (about 160° F.). Upon completion of the milling described above, the molten sodium stearoyl lactylate is added to the dispersed microcrystalline cellulose wetcake in the colloid mill hopper, maintained at a temperature of about 77° C. (about 170° F.) to keep the temperature within the colloid mill above the surfactant's melting point. The colloid mill is operated at a reduced rheostat setting of 50% to minimize foaming during addition of the surfactant.

The aqueous mixture of microcrystalline cellulose and surfactant is then homogenized at about 71° C. (about 160° F.) in a Manton-Gaulin homogenizer at 3,000 psi (2,500 psi first stage, 500 psi second stage).

The homogenized mixture of microcrystalline cellulose and surfactant, at a temperature of about 71° C. (about 160° F.) is then spray dried in a 3 ft. (0.91 m) diameter Stork Bowen spray dryer fitted with a two-fluid nozzle atomizer having a 0.1 in. (2.5 mm) nozzle and atomized at 90 psi. Dryer operating temperatures are 150° C. (302° F.) inlet and 80° C. (176° C.) outlet. The spray dried product is a powder that contains about 2–4% by weight moisture. The product, an aggregate of microcrystalline cellulose and surfactant in an 80:20 weight ratio, is screened through a US 60 mesh screen to yield a dry, free flowing product.

Food applications for this product include gelled foods such as lowfat pudding desserts, and low fat or nonfat food products such as pourable and viscous dressings and the like.

Example 11

This Example follows the procedure described in Example 10 but uses a sucrose stearate ester in lieu of the sodium stearoyl lactylate surfactant of Example 10.

The surfactant is a mixture of sucrose stearate esters, Type S-570 sucrose stearate surfactant, containing 30% monostearate ester, from Mitsubishi-Kasei Foods Co., Tokyo, Japan and is used at a weight ratio of about 80:20 microcrystalline cellulose to surfactant. The HLB value of this sucrose stearate surfactant is about 5.

The procedure described in Example 10 is followed, except that the surfactant is prepared as follows. The sucrose stearate ester surfactant powder, in an amount of 400 g, is melted in a container at a temperature of about 71° C. (160° F.), and hot deionized water, at a temperature of about 82°–93° C. (about 180°–200° F.), is added slowly with mixing in an amount equal to the volume of surfactant already present in the container. The aqueous surfactant mixture is then slowly added to the microcrystalline cellulose dispersion in the colloid mill, at a temperature of about 82°–93° C. (180°–200° F.). The rest of the procedure is the same as that described for Example 10.

Food applications for this product include reduced fat confections, frozen desserts, spreads and the like.

Example 12

Other surfactant-containing colloidal microcrystalline cellulose powder aggregates may be prepared using procedures essentially similar to those described in Examples 10 and 11, employing the microcrystalline cellulose described in those examples, but using different surfactants and the same or different weight ratios of microcrystalline cellulose to surfactant.

Particularly useful as stabilizers in reduced fat or lowfat food systems are the following surfactant-containing microcrystalline cellulose aggregates.

A. Surfactant: MYVATEX® Mighty Soft surfactant (Eastman Chemical Co., Kingsport, Tenn., U.S.A.), containing distilled monoglyceride, with an HLB value of 3.8.
Microcrystalline cellulose to surfactant weight ratio: 85:15
Applications: dairy products such as low fat frozen desserts.

B. Surfactant: a 2:1 weight ratio mixture of TWEEN®60 surfactant (ICI Americas, Inc., Wilmington, Del., U.S.A.), containing polyoxyethylene (20) sorbitan monostearate, with an HLB value of 14.9, and MYVEROL® 18–35K surfactant (Eastman Chemical Co.), containing distilled monoglyceride derived from refined palm oil, with an HLB value of 4.0; the presence of the TWEEN®60 surfactant appears to facilitate coprocessing of the MYVEROL® 18–35 surfactant with the microcrystalline cellulose.
Microcrystalline cellulose to surfactant (mixture) weight ratio: 65:35
Applications: bakery products such as low fat layer cakes; dairy products such as low fat bakers whipped toppings.

C. Surfactant: PANODAN® 150K surfactant (Grinstead Division of Danisco Ingredients USA, Inc., New Century, Kans., U.S.A.), containing diacetyl tartaric acid esters of monoglyceride, with an HLB value of 8.0.
Microcrystalline cellulose to surfactant weight ratio: 80:20
Applications: food products such as reduced fat pourable or viscous dressings.

D. Surfactant: MYVEROL® SMG VK (Eastman Chemical Co.), containing succinylated distilled monoglycerides from hydrogenated palm oil or palm stearin, with an HLB value of 5.3.
Microcrystalline cellulose to surfactant weight ratio: 80:20
Applications: reduced fat pourable or viscous dressings.

E. Surfactant: TRIODAN® R90 surfactant (Grinstead Division of Danisco Ingredients USA, Inc., New Century, Kans., U.S.A.), containing polyglycerol esters of fatty acids.
Microcrystalline cellulose to surfactant weight ratio: 65:35
Applications: reduced fat (1–40% fat) spreads.

F. Surfactant: RYOTO® ER-290 (Mitsubish-Kasei America Inc., White Plains, N.Y., U.S.A.), containing a sucrose fatty acid ester, sucrose erucate, with 2% monoester content and an HLB value of 2.
Microcrystalline cellulose to surfactant weight ratio: 65:35
Applications: emulsion food products such as reduced fat (1–40% fat) spreads.

G. Surfactant: DIMODAN® LSK (Grinstead Division of Danisco Ingredients USA, Inc., New Century, Kans., U.S.A.), containing distilled mono- and diglycerides from sunflower oil, with an HLB value between about 3.8–5.3.
Microcrystalline cellulose to surfactant weight ratio: 65:35
Applications: emulsion food products such as reduced fat (1–40% fat) spreads.

H. Surfactant: MYVEROL® P-06 surfactant (Eastman Chemical Co.), a distilled monoester from hydrogenated soybean oil and propylene glycol, with an HLB value of 3.8.
Microcrystalline cellulose to surfactant weight ratio: 80:20
Applications: food products such as reduced fat pourable or viscous dressings.

I. Surfactant: LACTODAN® P22K surfactant (Grinsted Division of Danisco Ingredients USA, Inc., New Century, Kans., U.S.A.), lactic acid esters of monoglycerides, with an HLB value between about 5.1–8.2.
Microcrystalline cellulose to surfactant weight ratio: 80:20
Applications: food products such as reduced fat pourable or viscous dressings and low fat chocolate mousse.

J. Surfactant: ATMUL®84K surfactant (Witco Corp.), containing distilled mono- and diglycerides, containing at least 40% alpha monoglyceride and an HLB value of 2.8.
Microcrystalline cellulose to surfactant weight ratio: 80:20
Applications: food products such as reduced fat pourable or viscous dressings and low fat meat emulsions.

K. Surfactant: MYVATEX® Texture Light food emulsifier (Eastman Chemical Co.), containing a mixture of distilled monoglycerides, distilled propylene glycol monoesters, sodium stearoyl lactylate, with silicon dioxide, with an HLB value of 3.8–4.0.
Microcrystalline cellulose to surfactant weight ratio: 65:35
Applications: dairy foods such as low fat toppings.

L. Surfactant: a 2:1 weight ratio mixture of TWEEN® 60 surfactant (ICI Americas, Inc.), containing polyoxyethylene (20) sorbitan monostearate, with an HLB value of 14.9 and MYVEROL® 18–35K surfactant (Eastman Chemical Co.), containing distilled monoglyceride derived from refined palm oil, with an HLB value of 4.0.
Additional component in coprocessed cellulose aggregate: carboxymethyl cellulose (CMC), AQUALON® carboxymethyl cellulose 7HF (Hercules Incorporated, Wilmington, Del., U.S.A.).
Microcrystalline cellulose to surfactant to CMC weight ratio: 62.5:30:7.5
Applications: bakery products such as low fat layer cakes; dairy products such as low fat bakers whipped toppings.

M. Surfactant: MYVATEX® Texture Light food emulsifier (Eastman Chemical Co.), containing a mixture of distilled monoglycerides, distilled propylene glycol monoesters, sodium stearoyl lactylate, with silicon dioxide, with an HLB value of 3.8–4.0.
Additional component in coprocessed cellulose aggregate: carboxymethyl cellulose (CMC), AQUALON® carboxymethyl cellulose 7HF (Hercules Incorporated)
Microcrystalline cellulose to surfactant to CMC weight ratio: 62.5:30:7.5
Applications: bakery products such as low fat layer cakes; dairy products such as low fat bakers whipped toppings.

Example 13

This Example illustrates the use of a surfactant-containing colloidal microcrystalline cellulose aggregate in a stabilizer-emulsifier system for a low fat (6% fat) ice cream formulation. The cellulose aggregate used in this Example was that described in Example 12A, being microcrystalline cellulose coprocessed with a MYVATEX® Mighty Soft distilled monoglyceride surfactant (Eastman Chemical Company, Kingsport, Tenn., U.S.A.), utilized in a weight ratio of 85:15 microcrystalline cellulose to surfactant.

The formulation of the low fat ice cream was as follows:

| Ingredients | Amount (wt %) |
|---|---|
| Dairy Components: | |
| Milk solids nonfat (serum solids) | 11.12 |
| Milk fat | 5.90 |
| Sweeteners: | |
| Corn syrup solids (42 dextrose equivalent) | 5.25 |
| Sucrose | 12.00 |
| Stabilizing or Emulisifying Components | |
| Cellulose aggregate | 0.44 |
| Mono-diglyceride emulsifier (MYVATEX ® Mighty Soft) | 0.11 |
| Guar gum | 0.15 |
| Carrageenan (kappa) | 0.02 |
| Total Solids | 34.99 |
| Water | 65.01 |

The solids composition of the dairy components in this formulation could be obtained from blending 45.86% by weight skim milk, 31.5% by weight light cream and 4.67% by weight skim milk powder. The remaining 65.01% by weight of the above-noted formulation would be water, e.g., from the skim milk portion. It should be evident to one skilled in the art that dairy components other than those just described could be employed provided that the milk solids nonfat and milk fat composition remain the same.

The mono- and diglyceride emulsifier added was separate from the surfactant contained in the cellulose aggregate and was added to supplement the surfactant in the cellulose aggregate.

The low fat ice cream was prepared by conventional procedures used for making frozen desserts. The dry ingredients, i.e., the dry dairy components, sweeteners and stabilizer and emulsifier components, including the cellulose aggregate, were blended. The dry blend was then introduced into the aqueous components, e.g., water, skim milk, cream and the like, with mixing for sufficient time to ensure hydration of the stabilizer components and dispersion of the cellulose aggregate.

The aqueous mixture was then pasteurized, e.g., via high temperature—short time (HTST) pasteurization, homogenized and refrigerated for a sufficient time to age, i.e., overnight. The mixture was then processed in a continuous ice cream freezer at the desired overrun ("overrun" is a measure of the amount of air deliberately introduced into the mixture; 100% overrun means that the frozen dessert product contains 50% air by volume).

The low fat ice cream stabilized with the cellulose aggregate had a dry smooth appearance during extrusion from the freezer barrel and possessed excellent mouthfeel characteristics.

Example 14

This Example illustrates the use of a surfactant-containing microcrystalline cellulose aggregate as a stabilizer in a nonfat whipped topping formulation. The cellulose aggregate used in this Example was that described in Example 12B, being microcrystalline cellulose coprocessed with a surfactant mixture, in a 2:1 weight ratio, of TWEEN®60 polyoxyethylene (20) sorbitan monostearate surfactant, and MYVEROL® 18–35 distilled monoglyceride surfactant. The surfactant mixture was utilized in a weight ratio of 70:30 microcrystalline cellulose to surfactant.

The formulation of the nonfat whipped topping was as follows:

| Ingredients | Amount (wt %) |
|---|---|
| Milk solids nonfat | 12.54 |
| Sugar | 9.03 |
| Fat | 6.00 |
| Corn syrup solids (36 dextrose equivalent) | 7.02 |
| Cellulose aggregate | 1.53 |
| Cellulose gel | 1.00 |
| Carboxymethylcellulose | 0.15 |
| Carrageenan | 0.06 |
| Water | 62.67 |
| Total | 100.00 |

The fat in the whipped topping formulation was PARAMOUNT® C partially hydrogenated palm kernel oil (Quest International, Oak Grove, Ill., U.S.A.) The cellulose gel, AVICEL® RC-581 (FMC Corporation, Philadelphia, Pa., U.S.A.), was included in the formulation to assist in foam stabilization, but may be omitted. The carboxymethylcellulose was AQUALON® CMC 7HF (Hercules Incorporated, Wilmington, Del., U.S.A.), and the carrageenan was an iota-carrageenan, GELCARIN® GP 379 (FMC Corporation).

The procedure used to prepare the whipped topping was as follows. The dry ingredients (MSNF, sugar, corn syrup solids, and carrageenan) were first dry blended. The cellulose aggregate and cellulose gel were dispersed in water with a high shear mixer, being mixed for 10 minutes. The dry blend was then added to the aqueous mixture and mixing continued for another 10 minutes. The aqueous mixture was heated to a temperature of 145° F. (63° C.), and the fat, in a separate container, was heated to 140° F. (60° C.). The aqueous mixture and fat were then combined and pasteurized via HTST at 175° F. (79° C.) for 15 seconds.

The pasteurized mixture was homogenized in a two-stage homogenizer (2000/500 psi) and then cooled to 40° F. (4° C.) and aged for an appropriate length of time to allow the fat and emulsifier to interact, typically 0.5–4 hours. The homogenized, aged mixture was aerated in an Oakes mixer, to an overrun of about 200–300% and packaged. The high overrun of the whipped topping provides an aerated product that by volume contains less than 0.5 g fat per serving, which is deemed to be a "non-fat" whipped topping under U.S. regulatory standards. The nonfat whipped topping contained the desired overrun and exhibited good freezing characteristics and good stability measured over a short term (5 days).

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A method for stabilizing, texturing or bulking an aqueous-based food system comprising incorporating into the aqueous-based food system a composition comprising an aggregate having about 60% to about 95% by weight of a finely divided substantially colloidal microcrystalline cellulose having a mean particle size of from about 0.1 to less than about 1 micron and having about 5% to about 40% by weight surfactant coprocessed with the cellulose, all percentages being based on the total weight of the aggregate.

2. The method of claim 1 wherein the aggregate contains about 5% to about 30% by weight surfactant, based on the total weight of the aggregate.

3. The method of claim 2 wherein the finely divided cellulose component comprises microcrystalline cellulose particles having a mean particle size of from about 0.1 to about 0.6 micron.

4. The method of claim 1 wherein the surfactant has a hydrophilic lipophilic balance of about 1 to about 25.

5. The method of claim 1 wherein the surfactant is a mixture of at least two surfactants.

6. The method of claim 1 wherein the surfactant is selected from the group consisting of sodium stearoyl lactylate, a monoglyceride, a diglyceride, a monoglyceride ester, a diglyceride ester, an ethoxylated monoglyceride, lecithin, a sorbitan ester, a monostearate, a polysorbate, a sucrose ester, a propylene glycol monoester, a polyglycerol ester of fatty acids, and mixtures of these.

7. The method of claim 6 wherein the surfactant is a monoglyceride or diglyceride ester of an acid selected from the group consisting of acetic acid, lactic acid, diacetyltartaric acid and succinic acid.

8. The method of claim 1 wherein the surfactant is sodium stearoyl lactylate.

9. The method of claim 1 wherein the aggregate consists essentially of microcrystalline cellulose and surfactant.

10. An aqueous-based food product comprising a reduced fat food product containing a composition comprising an aggregate having about 60% to about 95% by weight of a finely divided substantially colloidal cellulose component having a mean particle size of from about 0.1 to about less than 1 micron and having about 5% to about 40% by weight of a surfactant component coprocessed with the cellulose, all percentages being used based on the total weight of the aggregate.

11. The food product of claim 10 wherein the food product is a nonfat product.

12. The food product of claim 10 wherein the food product contains less than about 10% by weight fat.

13. The food product of claim 10 wherein the food product is a viscous dressing or a pourable dressing containing less than about 5% by weight fat.

14. A food product comprising an aqueous-based food and a composition comprising an aggregate having about 60% to about 95% by weight of a finely divided substantially colloidal cellulose component having a mean particle size of from about 0.1 to less than about 1 micron and having about 5% to about 40% by weight of a surfactant component coprocessed with the cellulose, all percentages being used based on the total weight of the aggregate.

15. The food product of claim 14 wherein the food product is selected from the group consisting of a frozen dessert, a whipped topping, a pourable dressing, a viscous dressing, a nondairy creamer, a dairy spread, a nondairy spread, a soup, a sauce, a gravy, a dip, a pudding, an extruded snack, a bakery product, a yogurt, a cheese and an emulsified meat.

16. The food product of claim 14 wherein said composition is present in an amount of from about 0.3% to about 5% by weight, based on the weight of the food product.

17. A method for making cellulose-surfactant aggregates which comprises forming a mixture of finely divided microcrystalline cellulose that is substantially colloidal in particle size having a mean particle size of from about 0.1 to about 0.9 micron and surfactant, said microcrystalline cellulose and said surfactant being present in a weight ratio of from about 95:5 to about 60:40; subjecting said mixture of microcrystalline cellulose and surfactant to high shear processing; and recovering the processed mixture as free flowing cellulose-surfactant aggregates.

18. The method of claim 17 wherein the surfactant is selected from the group consisting of sodium stearoyl lactylate, a monoglyceride, a diglyceride, a monoglyceride ester, a diglyceride ester, an ethoxylated monoglyceride, a lecithin, a sorbitan ester, a monostearate, a polysorbate, a sucrose ester, a propylene glycol monoester, a polyglycerol ester of fatty acids, and mixtures of these.

19. The method of claim 17 which further comprises introducing the microcrystalline cellulose and surfactant into an aqueous medium to form an aqueous mixture of microcrystalline cellulose and surfactant.

20. The method of claim 19 wherein the recovery step is accomplished by spray drying or fluid bed drying.

21. The method of claim 17 which further comprises dissolving the surfactant in an alcohol solvent before forming the mixture of microcrystalline cellulose and surfactant.

22. The method of claim 17 wherein the recovered aggregates have a mean size of from about 5 to about 30 microns.

* * * * *